Figure 1:
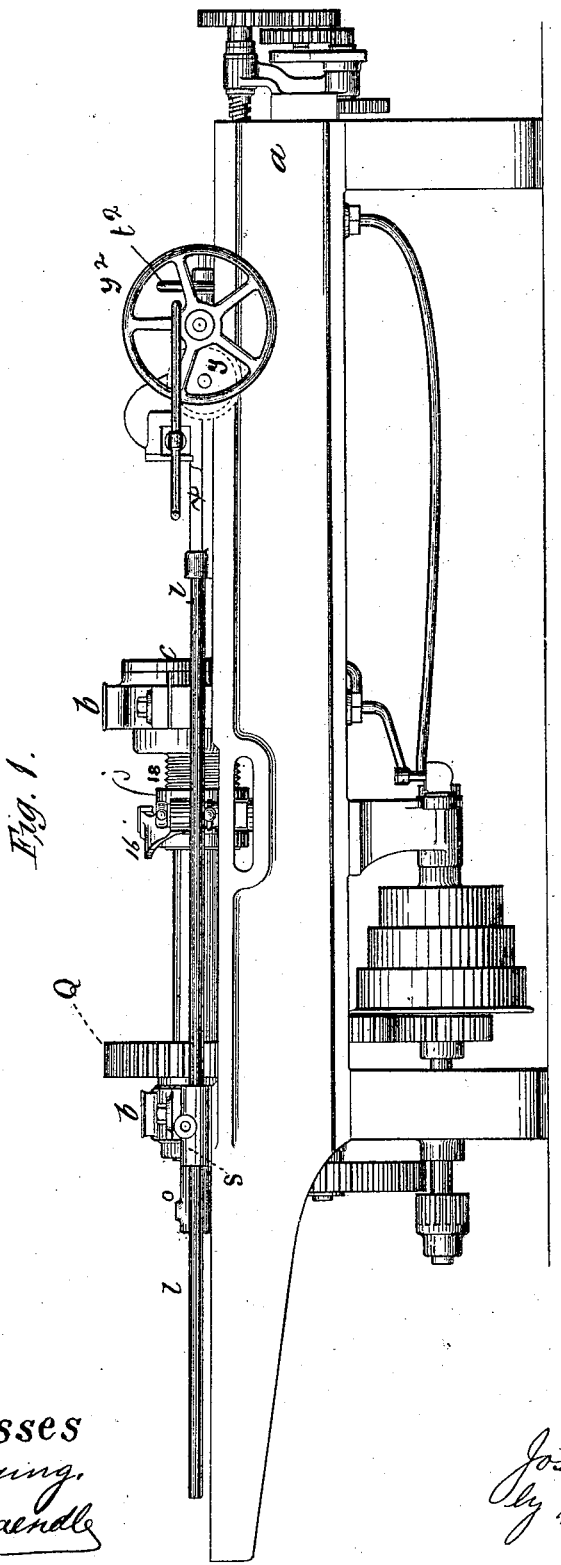

(No Model.)  
5 Sheets—Sheet 1.

J. BARROW.
SCREW CUTTING MACHINE.

No. 266,339. Patented Oct. 24, 1882.

Witnesses  
W. C. Young.  
Fred J. Braendle

Inventor,  
Joseph Barrow  
by M. H. Doolittle  
Attorney

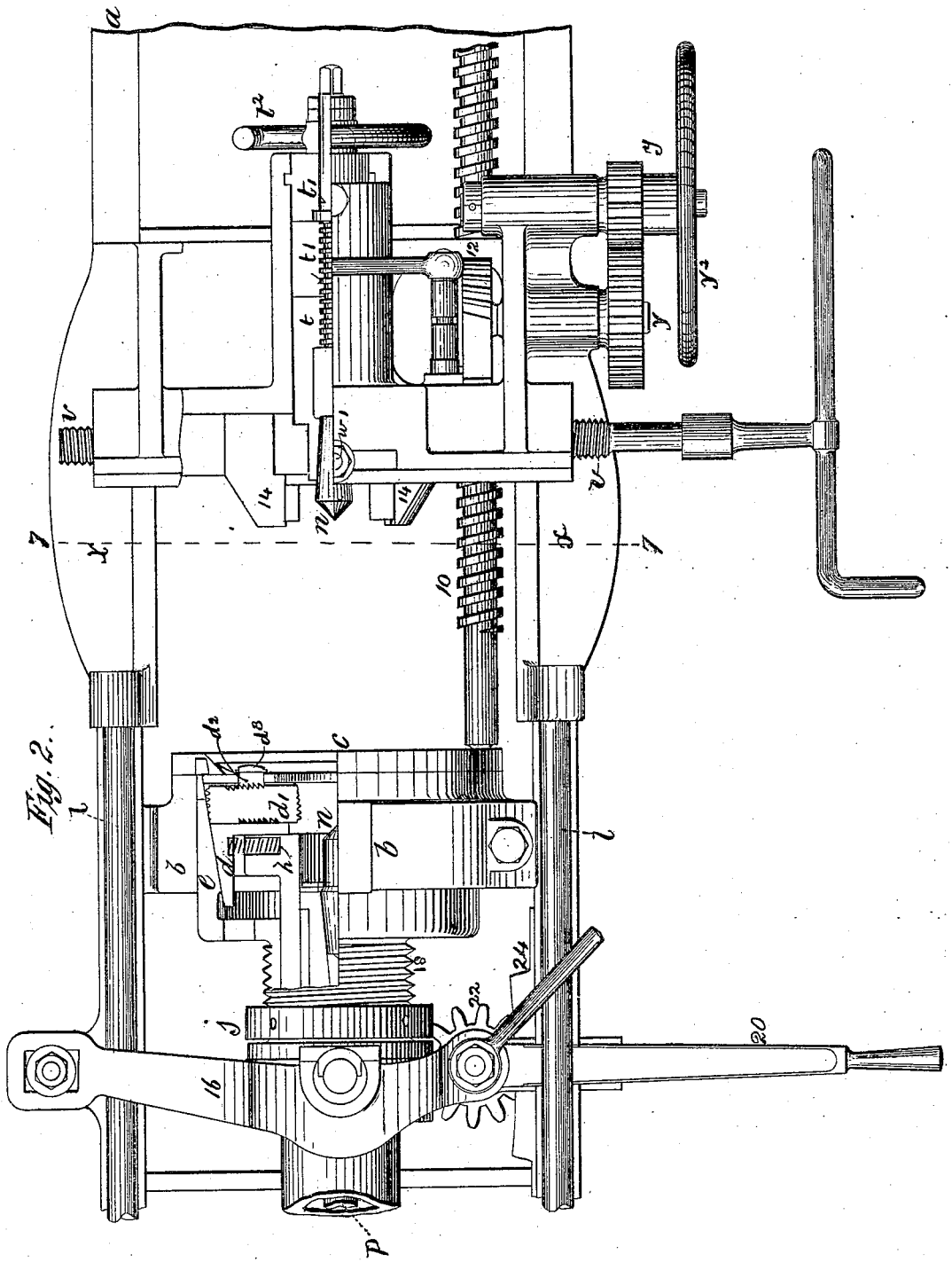

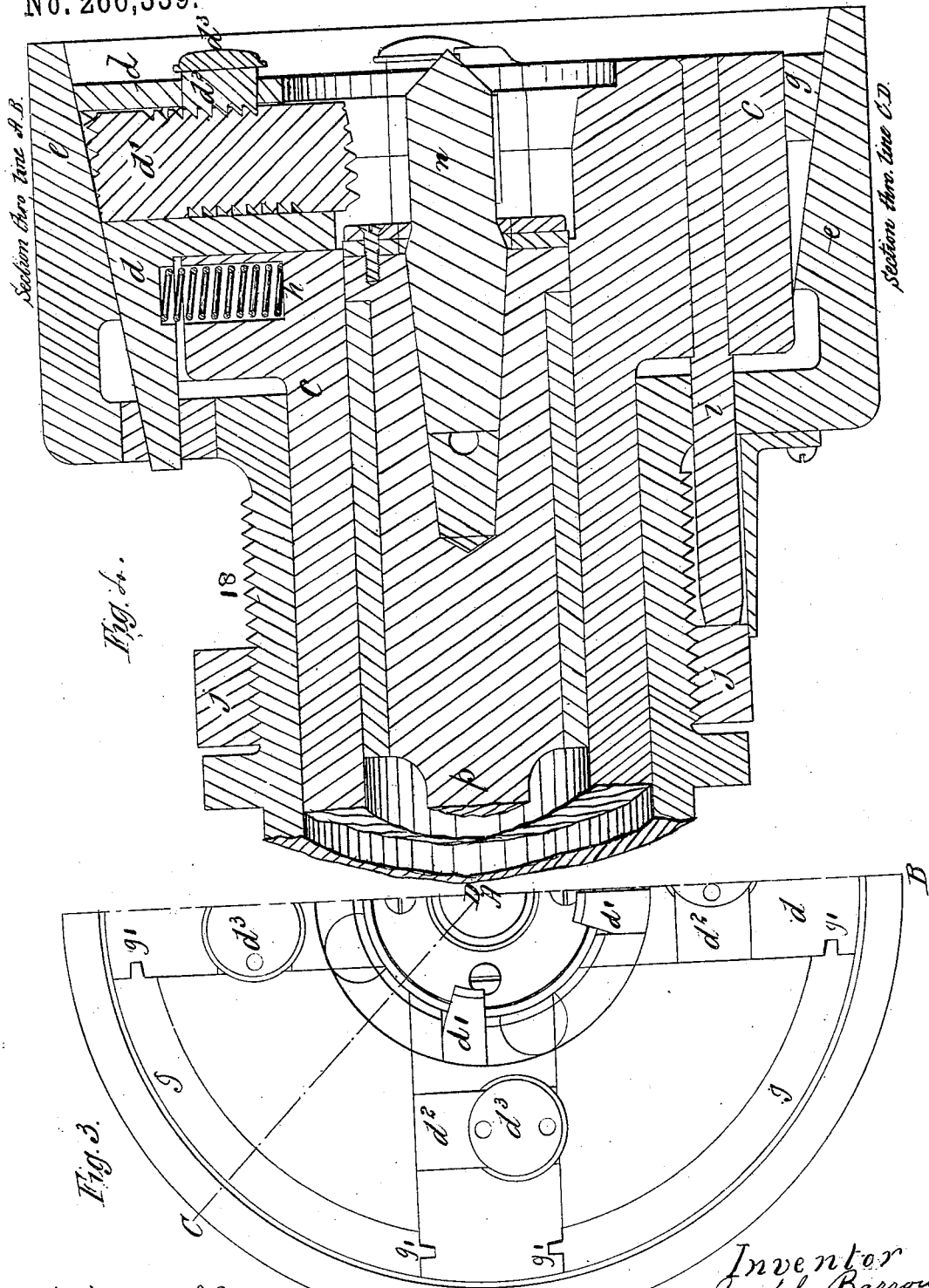

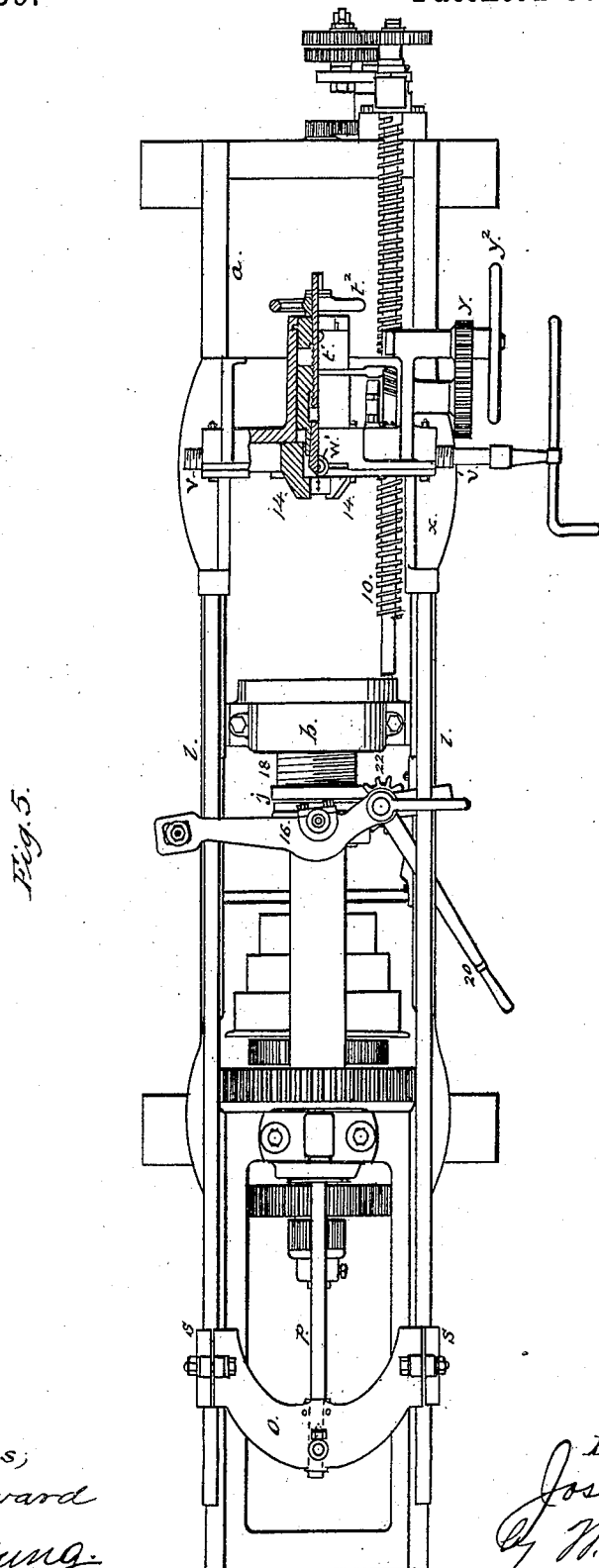

(No Model.)
J. BARROW.
SCREW CUTTING MACHINE.
No. 266,339.  Patented Oct. 24, 1882.
5 Sheets—Sheet 5.
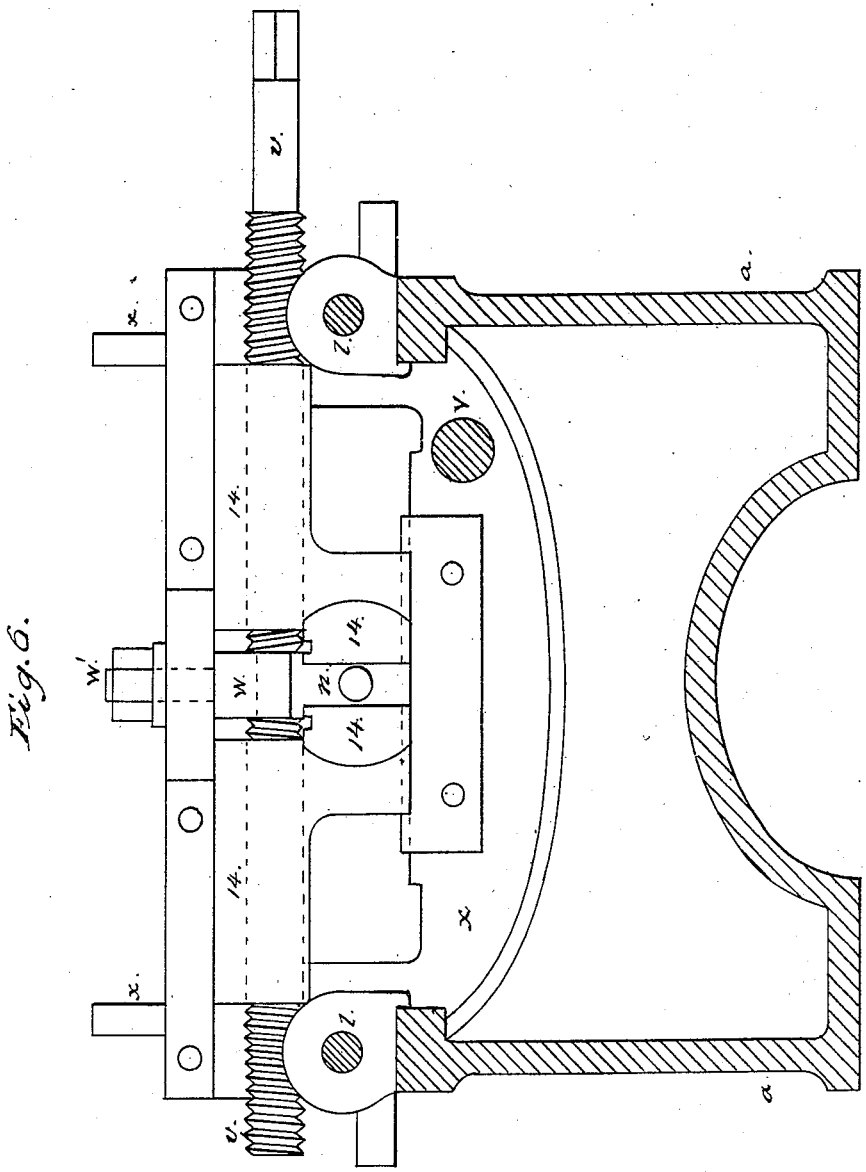
Witnesses:
F. W. Howard
W. C. Young
Inventor:
Joseph Barrow
by W. H. Doolittle
Attorney

UNITED STATES PATENT OFFICE.

JOSEPH BARROW, OF HEADINGLEY, NEAR LEEDS, COUNTY OF YORK, ENGLAND.

SCREW-CUTTING MACHINE.

SPECIFICATION forming part of Letters Patent No. 266,339, dated October 24, 1882.

Application filed August 22, 1882. (No model.) Patented in England October 29, 1872, No. 3,199.

*To all whom it may concern:*

Be it known that I, JOSEPH BARROW, a subject of the Queen of Great Britain and Ireland, residing at Headingley, near Leeds, in the county of York, Kingdom of Great Britain and Ireland, have invented an Improved Machine for Screw Cutting and Turning, (for which or material parts thereof I have obtained a patent in Great Britain, No. 3,199, bearing date October 29, 1872,) of which the following is a specification.

My invention relates to a machine of that class in which the cutting tools or dies revolve and the metal or material to be operated upon moves in the direction of its axis, but does not rotate. According to my invention the metal or material to be operated upon, whether for the purpose of screw-cutting or for the production of cylindrical or other forms, is held between centers, one center being carried by the traveling part or saddle, upon which is the vise or gripping apparatus for holding the work, and the other center moving axially within a hollow mandrel carrying the die-holders and their dies. The positions of the die-holders are adjusted simultaneously by means of a conical sleeve or tube or an inclined surface or surfaces arranged concentrically around the centers carrying the metal or material to be operated upon, so as to move the die-holders with their dies simultaneously toward or from the axis of the work, and thereby to adjust their positions accurately according to the diameter of the piece of metal to be operated upon, whether the dies be revolving or not.

Figure 1 is a side elevation of my improved machine. Fig. 2 is a plan, partly in section to a larger scale, of the central portion of the machine. Fig. 3 is an elevation of the chuck, half-full size. Fig. 4 is a section in lines A B C D, Fig. 3, to the same scale. Fig. 5 is an additional plan view of the whole of the machine; and Fig. 6 is a cross-section on line 7 7 of Fig. 2, showing the vise with the cover-plate removed.

The machine is shown constructed with a slide-bed, $a$, and bearings $b$ for carrying a hollow mandrel, with an enlarged chuck, $c$, at the front end, containing the die-holders $d$. This mandrel is made to revolve by suitable spur or other gearing.

Into the chuck are cut radial grooves, fitted with die-holders $d$, which are formed or provided at their outer ends with inclined planes or surfaces, which fit against the inner surface of a sleeve or tube, $e$, made in the form of the frustum of a cone, and the die-holders are kept to the inner surfaces of the sleeve by the keeps $g$, which for this purpose, assisted by the springs $h$, are fastened to the sleeve and provided at the ends with a tongue fitting a corresponding groove, $g'$, formed in the side of the die-holders. The sleeve, which is fitted on the mandrel, revolves in the bearing $b$, and is made to move endwise by means of a lever, 16, or other suitable means. The lever 16, as shown in the drawings, is actuated by a lever, 20, keyed to a pinion, 22, which works in a rack, 24, fastened to the bed, the object being to obtain more power than the prolongation of the lever 16 would admit. This end movement in one direction causes the die-holders to simultaneously close and in the other to open along the radial grooves of the chuck, carrying with them the dies $d'$. These dies have a serrated face cut upon them by a chasing-tool, into which a holding-block, $d^2$, fits, which is kept in position by a set-screw, $d^3$. By this arrangement, in which the die-holders, and not as is usually the case, the dies alone, are made to contract and expand, the dies are enabled to be cut with the same or other thread at each end, also the dies, being forced against the bottoms of their respective die-holders by the block and set-screw, are kept rigidly true in relation to their threads or figured sections whenever placed in position. In addition, also, as the die-block fits into any of the serrations of the die, the steel can be brought forward and cut at each end many times to the same diameter, thus fully utilizing the steel.

For bringing the dies to a gage, I use two stop-pins, $i$, against which a corresponding ring-stop, $j$, on the sleeve $e$ is brought to bear by the lever 16 or other suitable means. This ring-stop is adjustable along the sleeve upon the screw 18, cut upon it.

I prefer to use not less than four dies and die-holders, though any greater number practicable can be used. I prefer the cutting action of the dies to be at the line of centers.

The front threads are cut or chamfered away, as in ordinary die-cutting, a portion of the threads being left parallel.

For securing the concentricity of the screw-thread with the rest of the work, I place the work between two centers, $n\ n$, carried in a frame, one end forming the holding arrangement for the work and the other being a cross-bar, $o$, having in its middle a turned rod, $p$, passing through the hollow mandrel and carrying the center $n$. For the purpose of closing or opening these centers upon the work, I use two connecting-rods, $l$, placed apart to clear the driving-wheel Q, keyed on the hollow mandrel, which rods slide through the grippers $s$, which set the frame carrying the two centers $n$ at any required distance apart.

I am aware that in a screw-cutting machine a rod has been used placed on one side only to connect the centers carrying the work; but to equalize the pressure, both upon the work and the machine, it is necessary to use a rod upon each side, in accordance with my invention. The work is tightened between these centers by the spindle $t$, screw, and hand-wheel $t^2$. When the machine is used for tapping nuts or screwing long rods the spindle $t$ is taken out of the machine.

The holding arrangement I prefer to be two jaws, 14, moved by a right-and-left-hand screw, $v$, with a collar having a free end-play by means of the bearing $w$ moving in a slot, but which play can be stopped by tightening the nut $w'$ and fastening the bearing. These jaws will grip nuts, bolt-heads, or rods, and are fitted in a saddle, $x$, which is made to slide on the bed of the machine by the guide-screw 10 and change-wheels, or other suitable means.

For tapping nuts, I use a tap-holder chuck-bolted to the hollow mandrel and recessed to carry suitable tap-holders. A chuck may also be fastened for holding work to be tapped that has been previously bored, in which case the tap is held between centers.

The process of working is as follows: For screwing bolts and rods previously centered, I place them between the centers $n\ n$, screwing the latter together by the spindle $t$ and screw $t'$ and hand-wheel $t^2$. The holding-jaws 14 are then made to close on the head of the bolt, the end-play of the collar-bearing $w$ of the screw allowing for any inequality of the work and preventing any lateral strain upon the center. The dies are brought to gage by the ring-stop $j$, which abuts against the heads of pins $i'$, and the work is brought forward by making use of the guide-screw 10 as a rack and the nut 12 as a pinion, moved by the pinions $y\ y$ and hand-wheel $y^2$, or by any other suitable means, so as to engage the dies, which, when required, are expanded by the lever 16, or other means, and the work released without stopping the machine.

By substituting plain cutters for screwed cutters and placing such work as bolts and rods between centers, plain cylinders will result, and by substituting figured cutters and closing them upon work fixed between the centers corresponding figured work will result.

For screwing rough work, the operation will be better and more readily done by first center-punching it and using the above-described apparatus, although this is not absolutely necessary.

The reaction of the strains caused by the cutting-dies on the work being self-contained within the hollow mandrel, and taken by a dead thrust equally against the inclined surfaces of the sleeve, all revolving concentrically around the center carrying the work, and the machine not being subjected to the vibration caused by revolving irregular rough work, it is evident that large work—such as bolts, rods, and joints with screwed ends, such as are used for marine engines, and now done in slide and screw-cutting-lathes—can be finished with a great saving of skilled labor in this machine, and where continuous sliding or screwing is required the work may be made to pass through dies, and by successive grips passed through the machine. In this case the cross-bar and the rod carrying the center are removed.

Having described my said invention and explained the manner of carrying the same into practical effect, what I claim is—

1. In a machine for screw cutting and turning in which the cutting tools or dies revolve and the metal to be operated upon moves in the direction of its axis, but does not rotate, the combination, for holding the material to be operated on, of a center carried by the traveling part or saddle, that carries the vise or gripping apparatus for holding the work, with a second center moving axially within a hollow mandrel, the two connecting-rods, one on each side, the rigid frame or cross-bar, the die-holders, and their dies, arranged for the purposes and substantially in the manner set forth.

2. In a machine for screw cutting and turning, the means for adjusting the position of the die-holders simultaneously, consisting of a conical sleeve or tube with inclined surfaces, arranged concentrically, in combination with the two centers carrying the metal to be operated upon, and the two connecting-rods—one on each side of the machine—substantially as described.

3. In a machine for screw cutting and turning, the combination of the head or chuck $c$, the die $d'$, having serrations, the block $d^2$, and the set-screw $d^3$, whereby the dies may be set up for recutting, substantially as described.

JOSEPH BARROW.

Witnesses:
　EDWARD WHITELEY,
　JOSH HENRY WHITAKER,
　　*Both of Leeds.*